(12) United States Patent
Norden et al.

(10) Patent No.: US 8,993,137 B2
(45) Date of Patent: Mar. 31, 2015

(54) EMERGENCY COOLING DEVICE

(75) Inventors: Roland Norden, Markgroeningen (DE); Jochen Fassnacht, Calw (DE)

(73) Assignee: Robert Bosch GmbH, Stuttgart (DE)

( * ) Notice: Subject to any disclaimer, the term of this patent is extended or adjusted under 35 U.S.C. 154(b) by 163 days.

(21) Appl. No.: 13/499,574

(22) PCT Filed: Aug. 18, 2010

(86) PCT No.: PCT/EP2010/062009
§ 371 (c)(1),
(2), (4) Date: Jun. 15, 2012

(87) PCT Pub. No.: WO2011/038986
PCT Pub. Date: Apr. 7, 2011

(65) Prior Publication Data
US 2012/0263981 A1    Oct. 18, 2012

(30) Foreign Application Priority Data

Oct. 2, 2009    (DE) .......................... 10 2009 045 271

(51) Int. Cl.
| | | |
|---|---|---|
| *H01M 2/12* | (2006.01) | |
| *H01M 2/10* | (2006.01) | |
| *A62C 99/00* | (2010.01) | |
| *H01M 6/50* | (2006.01) | |
| *H01M 10/613* | (2014.01) | |
| *H01M 10/6569* | (2014.01) | |
| *H01M 10/625* | (2014.01) | |
| *H01M 10/6566* | (2014.01) | |

(52) U.S. Cl.
CPC ......... *H01M 2/1016* (2013.01); *A62C 99/0009* (2013.01); *H01M 2/1235* (2013.01); *H01M 6/5038* (2013.01); *H01M 10/5004* (2013.01); *H01M 10/5079* (2013.01); *H01M 10/5016* (2013.01); *H01M 10/5073* (2013.01); *H01M 2200/10* (2013.01); *H01M 2200/20* (2013.01)
USPC ............................................ 429/53; 429/433

(58) Field of Classification Search
CPC . H01M 2/12; H01M 10/5004; H01M 2/1241; H01M 2/1229; H01M 2/1235; H01M 2/345; H01M 2/127; H01M 2/0275; H01M 2/1223; H01M 10/50; H01M 2/1205; H01M 2/1258; H01M 2300/0085; H01M 6/5038
See application file for complete search history.

(56) References Cited

U.S. PATENT DOCUMENTS

2006/0022634 A1    2/2006   Nomura et al.

FOREIGN PATENT DOCUMENTS

| DE | 43 23 499 | 1/1995 |
|---|---|---|
| EP | 2 068 383 | 6/2009 |
| EP | 2 077 592 | 7/2009 |
| JP | 2003-156150 | 5/2003 |
| JP | 2005-153594 | 6/2005 |
| JP | 2007 027011 | 2/2007 |
| JP | 2008-16346 | 1/2008 |
| JP | 2008 016346 | 1/2008 |
| JP | 2008-251308 | 10/2008 |
| JP | 2008-276997 | 11/2008 |
| JP | 2009-170222 | 7/2009 |
| WO | WO 2007/039999 | 12/2007 |
| WO | 2008/120056 | 10/2008 |

*Primary Examiner* — Patrick Ryan
*Assistant Examiner* — Lucas J O'Donnell
(74) *Attorney, Agent, or Firm* — Kenyon & Kenyon LLP

(57) ABSTRACT

An energy storage system, in particular a battery having a plurality of battery cells. These battery cells are accommodated in a first container. The first container is separated from a second container by a separating element, which allows for establishing a pressure difference $\Delta p$ for expansion of a gas out of the first container into the second container.

8 Claims, 1 Drawing Sheet

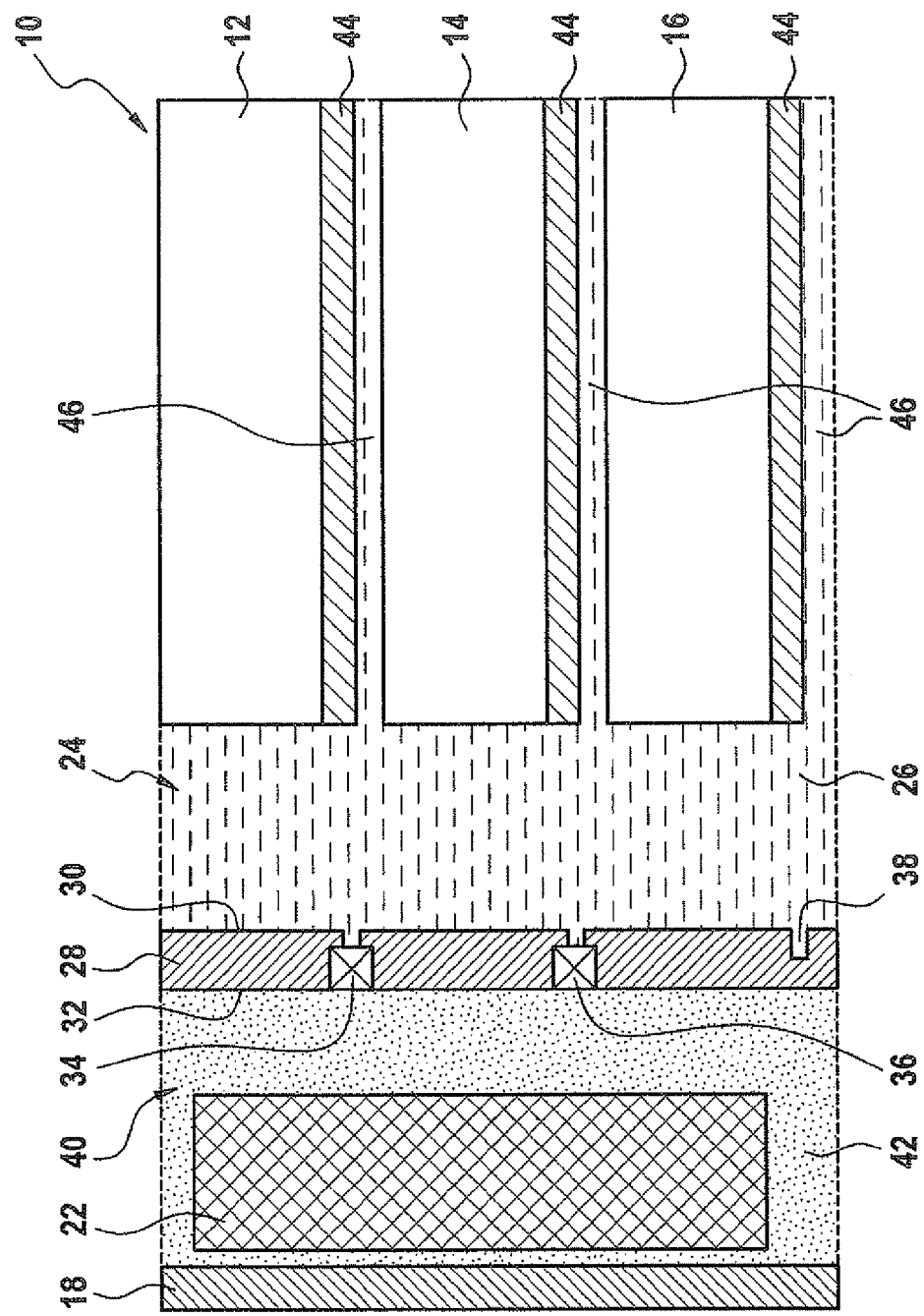

EMERGENCY COOLING DEVICE

FIELD OF THE INVENTION

The present invention relates to an energy storage system.

BACKGROUND INFORMATION

In the wake of developments for electric automobiles and hybrid drives for vehicles having a combination of internal combustion engines and electric motors, very high demands are made of batteries for future automotive generations with regard to the lifetime of the energy content and efficiency. To meet these demands, many types of batteries have active cooling, by using a coolant, a refrigerant or air, for example. In the case of batteries such as lithium ion batteries, it is also frequently advisable to provide waste heat utilization or the option of preheating the battery. To do so, it is usually advantageous to provide thermal insulation for the battery to reduce thermal losses. Furthermore, batteries in vehicles have a reinforced housing to reduce the risk to occupants in the event of an accident or damage. For this reason, batteries are therefore often accommodated in encapsulated, thermally insulated housings.

Some types of batteries, for example, lithium ion batteries have a very high energy density, which is associated with the disadvantage that relatively large quantities of energy are stored in a very small space, so that very intense reactions may occur under some circumstances. Critical reactions may usually be extinguished or brought to a standstill by cooling to a temperature below a limiting temperature. If a battery such as a lithium ion battery, for example, is installed in a vehicle body in an encapsulated, thermally insulated housing, virtually no extinguishing or cooling of the battery from the outside is possible anymore because of the construction which encases and insulates the battery.

Batteries having a very high power density using the lithium ion batteries in question here are increasingly manifesting the phenomenon of thermal coupling. The phenomenon of thermal coupling is understood to mean that a battery which has exceeded a critical temperature once will continue to heat up until the battery is dead. However, in a very early phase of this phenomenon, also known as "thermal runaway," it is still possible to prevent such a thermal runaway by very rapid and intense cooling. This cannot be achieved by cooling with air or water because the design of the cooling system is not practical for such rapid and intense cooling of high thermal masses to prevent a thermal runaway, in particular of a lithium ion battery.

In summary, it may be concluded that the safety problem presented here is a main obstacle in the commercialization of such batteries.

SUMMARY OF THE INVENTION

The present invention is to provide a device, which is unwanted from the standpoint of exceeding the temperature, in particular an electrical energy storage mechanism such as a lithium ion battery, may be cooled rapidly to a temperature below a certain threshold temperature. This is achieved by the fact that a pressure difference between two separate containers is neutralized, a first gas container being in thermal contact with cooling points of the device cooling off and an additional second gas container being used to establish the pressure difference with respect to the first gas container, as required for the expansion of the gas.

A liquid may be provided in the aforementioned first container and a material absorbing this liquid, for example, a zeolite or a molecular sieve, may be provided in the aforementioned second container to increase the cooling performance through evaporative cooling. In addition, a housing wall of the first container is designed to be particularly brittle and may be provided with intended breaking points at the transition locations to thermally critical points. The outside housing of the additional second gas container may surround the first gas container and has a housing manufactured from soft material with respect to the first gas container, this housing being deformed under mechanical damage but leakage being extremely difficult to induce.

Cooling is triggered by rupture of the brittle separating wall between the first and second gas containers, for example, as the result of an accident, or by opening a thermal valve at an excess temperature or by triggering an electrical valve.

An inert gas, which is also able to inhibit a fire by interrupting the oxygen supply, is used as the residual gas to fill the two gas containers. Nitrogen, for example, or noble gases are suitable as the inert gas.

The advantages achievable using the approach according to the exemplary embodiments and/or exemplary methods of the present invention include a high achievable inherent thermal security. By initiating the cooling process according to the exemplary embodiments and/or exemplary methods of the present invention, it is sufficient to cool an energy storage system, in particular a lithium ion battery, only once in the direction of subcritical temperature ranges. In combination with an electrical disconnect, the battery is thus converted to an inherently safe state, so that the thermal runaway phenomenon is effectively suppressed. As a result of this, a risk to life and limb of the occupants of the vehicle may be avoided and property damage in the form of a complete burn-up of the vehicle are prevented.

The approach according to the exemplary embodiments and/or exemplary methods of the present invention involves a passive design measure, which does not require any obligatory electrical self-energy supply to monitor or initiate countermeasures. This is of particular interest in the case of safety-relevant systems because safety and robustness are increased in the event of a defective power supply or in overseas shipping, for example.

Furthermore, in addition to the thermal measure of cooling when using residual inert gas for filling the gas containers, chemical oxidation may be counteracted through the approach according to the exemplary embodiments and/or exemplary methods of the present invention.

If the battery cells are damaged only partially or not at all after triggering of the method according to the present invention, the battery cells may be reprocessed by re-evaporating the liquid.

With regard to environmental safety, it should be pointed out that zeolites are nontoxic, nonflammable and occur relatively widely in nature, so there is a very high level of environmental safety.

The approach according to the exemplary embodiments and/or exemplary methods of the present invention is described in greater detail below on the basis of the single figure.

BRIEF DESCRIPTION OF THE DRAWING

The Figure shows the schematic layout of the energy storage system according to the present invention, including integrated emergency cooling.

DETAILED DESCRIPTION

The Figure shows an energy storage system. An energy storage system 10 includes a first container 24 and a second container 40. There are three battery cells within first container 24, namely a first battery cell 12, a second battery cell 14 and a third battery cell 16 in energy storage system 10 according to the drawing, for example. First container 24 in which the numerous battery cells 12, 14, 16 are accommodated is surrounded by a first housing wall 28.

According to the exemplary embodiments and/or exemplary methods of the present invention, a device which reacts undesirably with regard to exceeding the temperature, in particular battery cells 12, 14, 16 provided in energy storage system 10 in first container 24, may be cooled rapidly to a temperature below a critical temperature by the energy storage system according to the drawing. Energy storage system 10 according to the drawing is in particular a lithium ion battery having a plurality of battery cells 12, 14, 16, not necessarily limited to the three battery cells shown in the drawing but instead possibly also having a greater number of battery cells. The statements made below are applicable accordingly to an energy storage system 10 configured in this way in the form of a lithium ion battery.

Mapping below a critical threshold temperature takes place according to the exemplary embodiments and/or exemplary methods of the present invention by neutralizing the pressure difference between the two containers 24 and 40. First container 24—as shown in the drawing—is in thermal contact with the points to be cooled on the device to be cooled, i.e., in contact with battery cells 12, 14, 16 in the variant of the embodiment according to the drawing. The thermal contact is established by an absorbent layer 44, which is in contact with each battery cell 12, 14, 16 in first container 24.

Second container 40 is used to establish pressure difference Δp with first container 24, as required for gas expansion. First container 24 may contain a liquid 26, and second container 40 contains a material which is absorbent for this liquid 26, for example, a hydrophilic material, such as a zeolite or a molecular sieve. This makes it possible to increase the cooling performance through evaporative cooling, as explained in greater detail below.

In addition, housing wall 28 of first container 24 is made of a brittle material in particular and has intended breaking points 38, for example, which may be at the transition points to the thermally critical points, i.e., in the area in which absorbent layers 44 are located, each being assigned to battery cells 12, 14, 16. Housing wall 18 of second container 40 surrounds first container 24, in particular. Housing wall 18 of second container 40 is made of a softer, elastically deformable material, which is deformed with mechanical damage but retains its imperviousness and does not become leaky.

Emergency cooling may be initiated by rupture of a brittle separating element, namely housing wall 28 in the present case, which separates the interior of first container 24 from second container 40. The separating element, which is made of a brittle material, i.e., housing wall 28 of first container 24 in the present case, may be ruptured, for example, as the result of an accident or by opening a thermal valve 34 or by triggering an electrically triggerable valve 36, which is integrated into first housing wall 28 between first container 24 and second container 40.

First container 24, in which the temperature-critical points, i.e., battery cells 12, 14, 16, are located and which is filled with a liquid supply 26, for example, water, as well as the interior of second container 40, which is filled with a gas supply 42 and holds hydrophilic material 22, are both filled with a residual gas. The residual gas may be an inert gas such as $N_2$, helium or argon or the like, which also contributes to the interruption of the oxygen supply to the fire source in the event of a fire.

As shown in the drawing, the thermally critical areas, such as batteries 12, 14, 16 in the present case, inside first container 24 are connected to corresponding absorbent layers 44, which are located inside first container 24 and are consequently impregnated with liquid 26, for example, water. First container 24 is under a reduced pressure to the extent possible or is even evacuated, but it has a minimum pressure, which is below the vapor pressure of liquid 26; in the case of water, it is below the vapor pressure of water.

The pneumatic coupling between first container 24 and second container 40 may be established by thermal valves 34 or by electrically triggerable valves 36.

Second container 40 holds hydrophilic material 22, which is in particular a dried zeolite or a molecular sieve or another type of device which holds evaporated liquid 26 in a vapor state. In addition, there is also the possibility of providing a vacuum pump in second container 40. Like first container 24, a very low pressure or even a vacuum also prevails in second container 40.

If the connection between first container 24 and second container 40 is now interrupted by rupturing housing wall 28, which is designed to be brittle and functions as a separating element, or by breaking open an intended breaking point 38 or by the response of one or more thermal valves 34 or by triggering an electrical valve 36, the pressure difference between the two containers 24 and 40 is equalized. There is a sudden reduction in the pressure in first container 24 below the vapor pressure of liquid 26 stored there, resulting in evaporation of the liquid from corresponding absorbent layers 44, which are linked to battery cells 12, 14, 16.

The gas formed from liquid 26 is absorbed by associated hydrophilic material 22, for example, a dried zeolite or a molecular sieve, so that an equilibrium cannot be established immediately between first container 24 and second container 40. Consequently, the pressure in the entire system continues to remain below the vapor pressure of liquid 26 when separating element 28 has ruptured, so that further evaporation of same is possible.

Since hydrophilic material 22 is heated in this process, hydrophilic material 22 is coupled to a heat sink, for example, the automotive body of a vehicle, in which energy storage system 10 is accommodated.

After emergency cooling according to the exemplary embodiments and/or exemplary methods of the present invention has been performed, liquid 26 may be evaporated by heating hydrophilic material 22, so that absorbent layers 44 may again be impregnated with liquid and the original condition and thus the functionality of energy storage system 10 according to the exemplary embodiments and/or exemplary methods of the present invention may be thereby restored.

To implement energy storage system 10 according to the exemplary embodiments and/or exemplary methods of the present invention, the outer shell of energy storage system 10 may be designed with double walls, for example, and formed by housing wall 18 and housing wall 28 of containers 24, 40 forming a hollow space with the aforementioned housing wall. It is important in particular that housing wall 18 of second container 40 is designed to be tough and tight, which may be achieved by using materials such as aluminum or thermoplastics, for example. Second container 40 need not necessarily surround entire energy storage system 10 but instead may also constitute only parts of same. Furthermore, there is the possibility of arranging second container 40 outside of or completely separately from energy storage system 10 and implementing the connection to first container 24 through tubes or suitable piping. Second container 40 may be part of an automotive body, for example, i.e., it may be formed by the side members or cross members in the automotive frame. A depression on second container 40 may be implemented, for example, by a vacuum pump or through the vacuum prevailing in an internal combustion engine. In addition, there is the possibility of evacuating second container 40 through an electrically operable vacuum pump, which is also used for combustion support, for example. Instead of a vacuum, an excess pressure may also be created in the gas in first container 24 with respect to the pressure level prevailing in second container 40, this pressure then creating the cooling effect on expansion.

Instead of designing the separating element, i.e., housing wall 28 of first container 24, of zeolites or designing it as a molecular sieve, other liquid-absorbing materials may also be used. In particular materials having very fine pores and consequently having a very large internal surface area, such as activated carbon or silica gel, are suitable for this purpose. The residual gas with which first container 24 and second container 40 may be filled may be an inert gas, which is used to prevent oxidation. The gas may have a color or a noticeable odor to signal the danger due to the absence of a cooling effect if the gas escapes from the outer shell. The gas may also contain additional liquid or solid components, which counteract the spread of a fire. Air may also be used instead of an inert gas.

Housing wall 28 of first container 24, which functions as separating element 28, is to be manufactured of a breakable material or a brittle material. The possibility of a targeted opening is already provided by using intended breaking points 38. Alternatively, the intended breaking points (cf. item 38 in the drawing) may also be formed by the cell walls or module walls of battery cells 12, 14, 16 themselves.

In addition to the rupturing of separating element 28, i.e., the housing wall dividing first container 24 from second container 40 in the present exemplary embodiment, the pressure difference between first container 24 and second container 40 may also be neutralized by triggering an electronically controlled valve, for example, an electrical valve 36, integrated into housing wall 28. The cooling process associated with this may optionally also be initiated by a chemical process in addition to the mechanical action. Furthermore, the cooling process, i.e., the neutralization of the pressure difference between first container 24 and second container 40, may also be achieved using a bimetal. Finally, there is the possibility of integrating the separating element, i.e., first housing wall 28 between first container 24 and second container 40, in a thermal valve 34, for example, a wax pill, which melts partially or entirely upon reaching a certain temperature, thus equalizing the pressure between the interior of first container 24 and the interior of second container 40.

The diagram according to the drawing shows that gaps 46 extend between corresponding absorbent layers 44 and battery cells 12, 14, 16 in first container 24. These gaps or channels 46 allow the most direct possible thermal connection to the thermally critical areas, i.e., battery cells 12, 14, 16. These gaps or channels are gas channels, which connect absorbent layers 44 thermally. Alternatively, these gaps or channels 46 must not be introduced into the thermally critical regions, namely battery cells 12, 14, 16 in the present case, but instead the cooling may be induced indirectly via elements which are good heat conductors. In this case, channels 46 do not continue all the way to battery cells 12, 14, 16 but instead are connected to absorbent layer 44 via thermally conductive materials, for example, metals or metal alloys.

Thermally critical areas, i.e., battery cells 12, 14, 16 of energy storage system 10 according to the present invention, may optionally also be cooled via connection of an evaporative cooling device to the cooling circuit of the device, for example, the liquid coolant circuit of energy storage system 10.

If only expansion upon reaching a critical temperature for the purpose of cooling is desired in the case of the energy storage system according to the present invention, expansion may be triggered automatically by a control unit via valves 34, 36 or a rupture capsule. This allows more selective triggering. Triggering of the emergency cooling process according to the exemplary embodiments and/or exemplary methods of the present invention may be initiated via a control unit or an electrically triggered valve 36 on detection of a vehicle accident. Triggering of the emergency cooling process may be initiated, for example, via a temperature sensor or a temperature model, which is stored in the control unit, on detection of an excess temperature. Triggering of the emergency cooling process according to the exemplary embodiments and/or exemplary methods of the present invention may be triggered on detection of an improper intervention, for example, opening of housing walls 18 or 28 of energy storage system 10. The cooling process may additionally be triggered when leakage of liquid 26 from first container 24 is detected or when a gas loss from second container 40 is detected.

The performance and the cooling rate may be preselected by regulating a refrigerant flow when the connection between first container 24 and second container 40 has not been established through mechanically irreversible destruction of the separating element, i.e., housing wall 28 between first container 24 and second container 40, but instead has been accomplished by selective triggering of an electrical valve 36 or by response of a thermal valve 34, such as the wax pill mentioned above. Valve 36 may be designed as a pressure limiting valve, for example, or may be triggered electrically. In addition, valve 36 may be controlled pneumatically, hydraulically or thermally.

The functionality of energy storage system 10 according to the exemplary embodiments and/or exemplary methods of the present invention or its emergency cooling option and thus the safety of the approach may be monitored by providing additional sensors. For example, a pressure sensor system may be used to monitor the pressure in first container 24 or in second container 40. A moisture sensor system may be installed to monitor the moisture content or the moisture in absorbent layer 44 within first container 24. In addition, a temperature sensor system, which monitors the temperature of individual battery cells 12, 14, 16 within first container 24 of energy storage system 10, may also be provided.

The emergency cooling process of energy storage system 10 may optionally be initiated by disconnecting the external power supply from the battery cells or battery modules 12, 14, 16 of energy storage system 10. Disconnection of the external power supply from the energy storage system may be monitored automatically by a pressure differential relay or a pressure sensor.

The creation of a low pressure level or a vacuum within first container 24 and second container 40 may be achieved by connecting them to a vacuum container or a vacuum source. For example, a vacuum pump, which is provided for the hydraulic power steering of a vehicle, may be tapped for this purpose. The approach according to the exemplary embodiments and/or exemplary methods of the present invention may optionally also be achieved via a manually operated pump to generate a vacuum, which also ensures the safety of the overall system, even in the absence of a vacuum supply.

After an emergency cooling operation has been performed, the energy storage system according to the exemplary embodiments and/or exemplary methods of the present invention may be regenerated by making use of an important property of zeolites, for example, which are used as the hydrophilic material and may be reversibly dehydrated for several hundred to several thousand cycles. This dehydration may be implemented by gradually introducing external heat. As an alternative to this, hydrophilic material 22 inside second container 40 may be regenerated by introducing waste heat from the device, i.e., by introducing lost heat from the battery. Regeneration may also be accomplished by connection to an external gas circuit, which supplies hot dry air to second container 40. In addition, hydrophilic material 22 inside second container 40 may also be regenerated by supplying a vacuum, so that the adsorbed liquid molecules, which are adsorbed in zeolites or in activated carbon or in silica gel, for example, are able to evaporate again.

The approach according to the exemplary embodiments and/or exemplary methods of the present invention, in which the separation between two containers 24 and 40 of an energy storage system 10 is eliminated, may also be accomplished in multiple steps. In this case, several containers 24, 40, one inside the other, may be connected to one another in a cascade to improve the efficiency of the process.

What is claimed is:

1. An energy storage system, comprising:
a first container;
a second container; and
a battery having a plurality of battery cells which are accommodated in the first container;
wherein the first container is separated from the second container by a separating element, by which a pressure difference, which enables a gas to expand out of the first container, is established with respect to the second container, wherein both (i) the interior of the first container accommodating the plurality of battery cells and (ii) the interior of the second container contain an inert gas to inhibit or interrupt the supply of oxygen to the plurality of battery cells, and wherein the first container additionally contains a liquid, and wherein a hydrophilic material is additionally contained in the second container, and wherein the second container surrounds the first container, and wherein the separating element includes a valve by which a connection is selectively established between the first container and the second container to achieve cooling of the battery cells in the first container by evaporation of the liquid contained in the first container and corresponding absorption of the evaporated liquid by the hydrophilic material contained in the second container.

2. The energy storage system of claim 1, wherein the second container has a deformable housing wall.

3. The energy storage system of claim 1, wherein the first container accommodating the plurality of battery cells has a housing wall which functions as the separating element.

4. The energy storage system of claim 1, wherein the hydrophilic material is one of a zeolite, a molecular sieve, a silica gel and an activated carbon.

5. The energy storage system of claim 1, wherein thermally critical locations, including the number of battery cells in the first container, are thermally linked to an absorbent layer which is impregnated with the liquid, and the first container is largely under a reduced pressure or is evacuated and has a minimum pressure, which is below the vapor pressure of the liquid.

6. The energy storage system of claim 1, wherein the hydrophilic material in the second container is thermally connected to a heat sink, and wherein the second container is under a reduced pressure or is evacuated.

7. The energy storage system of claim 1, wherein the inert gas includes at least one of $N_2$, He, and Ar.

8. The energy storage system of claim 1, wherein the hydrophilic material in the second container is thermally connected to a heat sink, which includes an automotive body, and wherein the second container is under a reduced pressure or is evacuated.

* * * * *